US008099633B2

(12) United States Patent
Nagano (10) Patent No.: US 8,099,633 B2
(45) Date of Patent: Jan. 17, 2012

(54) CIRCUIT FOR TESTING A USB DEVICE USING A PACKET TO BE MEASURED CONTROLLED BY TEST SIGNALS

(75) Inventor: Makoto Nagano, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 1149 days.

(21) Appl. No.: 11/902,555

(22) Filed: Sep. 24, 2007

(65) Prior Publication Data

US 2008/0082286 A1 Apr. 3, 2008

(30) Foreign Application Priority Data

Sep. 29, 2006 (JP) .................................. 2006-266655

(51) Int. Cl.
*G06F 11/00* (2006.01)

(52) U.S. Cl. .......................................... 714/43; 714/724

(58) Field of Classification Search ...................... 714/43
See application file for complete search history.

(56) References Cited

U.S. PATENT DOCUMENTS

| 5,940,414 | A | * | 8/1999 | Takano et al. ................. 714/733 |
| 6,629,169 | B2 | * | 9/2003 | Chu ................................. 710/72 |
| 6,880,027 | B1 | * | 4/2005 | Oguro ........................... 710/107 |
| 7,225,288 | B2 | * | 5/2007 | Schulze et al. ................ 710/313 |
| 7,299,389 | B2 | * | 11/2007 | Nishida et al. ................ 714/724 |
| 7,310,754 | B2 | * | 12/2007 | Nishida et al. ................ 714/724 |
| 7,912,462 | B2 | * | 3/2011 | Hazell ........................... 455/423 |
| 2002/0053056 | A1 | * | 5/2002 | Kuegler et al. ................ 714/733 |
| 2002/0133649 | A1 | * | 9/2002 | Chu ................................. 710/62 |
| 2004/0218665 | A1 | * | 11/2004 | Baba et al. ..................... 375/221 |
| 2004/0268193 | A1 | * | 12/2004 | Nishida et al. ................ 714/724 |
| 2005/0097403 | A1 | * | 5/2005 | Chen ................................ 714/43 |
| 2008/0028114 | A1 | * | 1/2008 | Mun .............................. 710/105 |
| 2008/0235405 | A1 | * | 9/2008 | Sakaguchi .................... 710/15 |
| 2009/0307384 | A1 | * | 12/2009 | Liu ................................ 710/19 |

FOREIGN PATENT DOCUMENTS

JP 2001-245017 7/2001
JP 2004233202 A 8/2004

OTHER PUBLICATIONS

Japanese Office Action; Notification of Reason for Refusal dated Mar. 10, 2009; Patent Application No. 2006-266655 with full English translation.

* cited by examiner

*Primary Examiner* — Scott Baderman
*Assistant Examiner* — Kamini Patel
(74) *Attorney, Agent, or Firm* — Studebaker & Brackett PC; Donald R. Studebaker

(57) ABSTRACT

A USB test circuit for use in a USB device such as a system LSI with a USB function for testing the USB function generates and outputs a packet to be measured for a signal quality test. In the test circuit, a test signal including a test_sin signal carrying operation mode information is inputted via a serial interface to a serial interface block, and a packet to be measured is generated by a data pattern generation block and a transmission data delivery block depending on the operation mode information. The packet to be measured is outputted via a UTMI interface to a USB PHY layer. Thus, a packet to be measured for a signal quality test is generated and outputted without receiving packets not to be measured such as a SETUP packet and a DATA packet, thereby reducing the test time.

8 Claims, 12 Drawing Sheets

CIRCUIT FOR TESTING A USB DEVICE USING A PACKET TO BE MEASURED CONTROLLED BY TEST SIGNALS

BACKGROUND OF THE INVENTION

1. Field of the Invention

The present invention relates to a USB (Universal Serial Bus) test circuit for testing a USB function, and particularly to a USB test circuit for use in a USB device such as a system LSI (Large Scale Integration) with a USB function for testing the USB function.

2. Description of the Background Art

The conventional system LSI operates using a built-in central processing unit (CPU). The CPU connects to via a system bus to other circuits to perform the functions of the circuits. Some of the system LSIs include a USB device controller connected to the system bus and a USB physical layer (PHY) connected to the controller, thus providing a USB function. The CPU can read and write data to registers included in the USB device controller.

The USB PHY layer connects, for example, via a USB 2.0 Transceiver Macrocell Interface (UTMI) to the USB device controller, and via a USB interface (I/F) to an external device. The USB PHY layer has a UTMI I/F controller block that controls the UTMI interface, and transmits and receives over the USB interface a DP/DM (Differential data Plus/Differential data Minus) signal.

The USB device controller serves to control the USB protocol. The USB device controller connects via a system bus interface to the system bus and via the UTMI interface to the USB PHY layer. The controller has the UTMI I/F controller block that controls the UTMI interface. The controller also has a protocol identifier (PID) decode block, a high-speed test packet generation block, and an acknowledgment (ACK) packet generation block.

The PID decode block functions as determining the type of a packet received on the DP/DM signal via the USB interface. The PID decode block decodes, for example, a received packet to detect a PID, and uses the PID to determine the packet type.

The high-speed test packet generation block serves to generate, when the system LSI operates in a test mode such as the compliance test mode, a test packet of the USB function in the high speed mode. In the high speed mode, when the USB device controller receives a request for the test packet generation from the USB interface, the high-speed test packet generation block generates a test packet and supplies it to the USB PHY layer. The USB PHY layer outputs the test packet via the USB interface on the DP/DM signal.

The ACK packet generation block functions as generating an ACK packet when the system LSI receives a packet via the USB interface and in response an ACK packet needs to be returned. The ACK packet generation block supplies the generated ACK packet to the USB PHY layer, which outputs the ACK packet on the DP/DM signal via the USB interface.

When the system LSI performs the USB compliance test to thereby measure the signal quality of the USB in the full speed/low speed mode, a reception of plural packets such as a SETUP packet or a DATA packet which are not to be measured by the USB device controller causes the controller to generate an ACK packet, which is to be measured for testing the signal quality, and to supply the ACK packet to the USB PHY layer, which in turn outputs the packet on a DP/DM signal.

When the system LSI performs the USB compliance test to thereby measure the signal quality of the USB in the high speed mode, a reception of plural packets that are not to be measured by the USB device controller causes to generate a test packet that is to be measured for testing the signal quality, and to supply the test packet to the USB PHY layer, which in turn outputs the packet on a DP/DM signal.

U.S. Pat. No. 6,880,027 B1 to Oguro discloses a USB function evaluation system that works as follows. The test pattern sent to the USB function is temporarily stored in an IN token storage memory. The data returned from the USB function is determined by a packet type determination circuit. If the returned data is the NAK type, the stored IN token is re-sent. If the returned data is the DATA type or STALL type, the held IN token is discarded. The time for the DATA packet to be ready for the return can thus be unconsidered during programming. The design efficiency of the test pattern can therefore be improved.

Japanese patent laid-open publication No. 2001-245017 discloses a USB simulation system that is configured as follows. The simulation system has storage media that stores test items and instructions for a simulation. A transaction manager manages the test items for each transaction. A received data determination portion determinates a reply signal. The determination result is used to create a branch for further processes. Test items to be performed or data to be transmitted in the next transaction can thus be selected.

The conventional system LSIs with the USB function have a problem, however, with the USB test as follows. When performing the USB test and allowing the USB PHY layer to output a packet for observation of the signal quality, the system LSIs need to transmit a plurality of redundant packets not directly related to the measurement to the USB device controller. More time is therefore required for the signal quality observation. For example, the system taught by Oguro or the Japanese '017 publication transmits an ACK signal in response to a packet not to be measured such as a SETUP packet or DATA packet received.

The SETUP packet is usually a 32-bit packet that has an 8-bit SYNC, an 8-bit PID, a 7-bit ADDR, a 4-bit ENDP, and a 5-bit CRC5 field. The DATA packet is usually a 96-bit packet that has an 8-bit SYNC, an 8-bit PID, a 64-bit DATA, and a 16-bit CRC16 field. When, therefore, the system LSIs are mass-produced and shipped after a test that starts on receipt of the packets not to be measured, the test will take a long time to receive those packets and the lengthy test time will significantly affect the LSI costs.

In the conventional USB devices with the USB test function, a plurality of test patterns have to be produced even for packets not to be measured, thereby needing much manpower for producing such test patterns and much time for debugging.

SUMMARY OF THE INVENTION

It is an object of the present invention to provide a USB test circuit for testing the USB function of a USB device such as a system LSI with a USB function, in which a packet to be measured for testing to be transmitted to observe the signal quality can be generated and outputted in a short time.

In accordance with the present invention, a USB test circuit for use in a USB device with a USB function for testing the USB function comprises: an input portion that receives from an external device a test signal including operation mode information of the circuit; and a generation portion that generates a packet to be measured for testing signal quality and outputs the packet, the generation portion generating the packet to be measured depending on the operation mode information inputted to the input portion.

According to the present invention, the USB test circuit is controlled by a test signal such as a test_sin signal or a test_stb signal that is inputted via a serial interface to generate and output a variety of packets to be measured, thereby outputting a packet to be measured for a signal quality test without receiving the packets not to be measured for the signal quality test, such as the SETUP packet and the DATA packet. The test circuit may thus eliminate the time needed for receiving the packets that are not to be measured, thereby reducing the test time particularly otherwise required mass-production and shipping products of USB device.

When, for example, the SETUP packet has 32 bits and the DATA packet has 96 bits, the USB test circuit according to the present invention may reduce the receiving time as follows. In a transfer rate mode of low speed, the receiving time of 85 μsec or more may be reduced, which is calculated from 32 bit×667 nsec+96 bit×667 nsec. In a full speed mode, the receiving time of 5.7 μsec or more may be reduced, which is calculated from 32 bit×83 nsec+96 bit×83 nsec. In a high speed mode, the receiving time of 256 nsec or more may be reduced, which is calculated from 32 bit×2 nsec+96 bit×2 nsec.

The USB test circuit according to the present invention may output a packet to be measured for the signal quality test without the necessity of externally generating a packet not to be measured or transmitting the latter packet to the LSI, thereby reducing manpower otherwise needed for producing test patterns and debugging.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
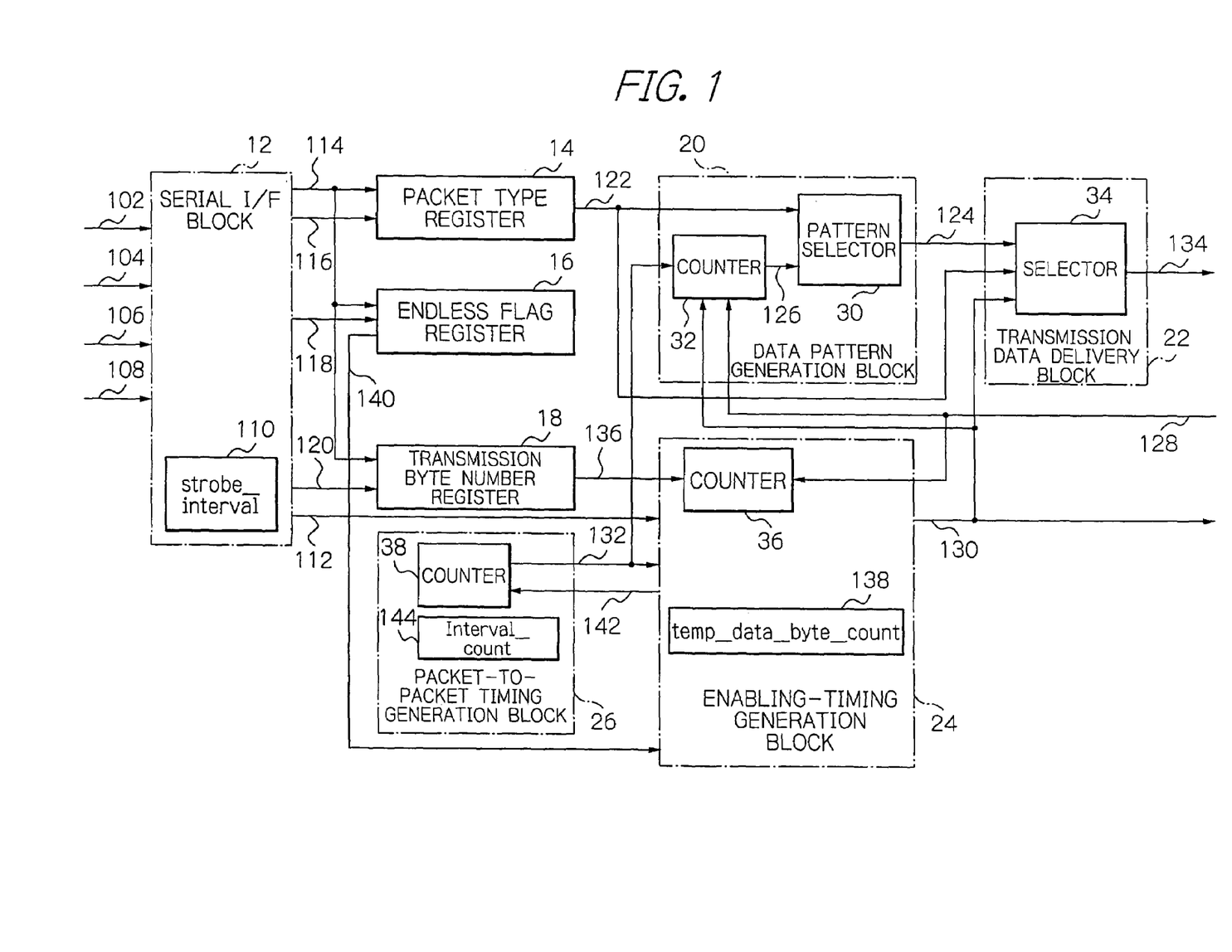
FIG. 1 is a schematic block diagram showing an embodiment of a USB test circuit in accordance with the present invention.

With reference to the accompanying drawings, a preferred embodiment of a USB test circuit according to the present invention will hereinafter be described in detail. For example, as shown in FIG. 1, in the USB (Universal Serial Bus) test circuit 10 of the present embodiment, a signal of information regarding the operation mode of the circuit 10 is inputted to a serial interface (I/F) block 12, the information is held in a packet type register 14, an endless flag register 16 and a transmission byte number register 18, transmission data that is a packet to be measured corresponding to the information is generated by a data pattern generation block 20 and a transmission data delivery block 22, and a timing for enabling the transmission data is generated by an enabling-timing generation block 24. Also in the circuit 10, the transmission data output is repeated at an output interval that is determined by a packet-to-packet timing generation block 26. It is noted that parts or elements not directly relevant to understanding the present invention will neither be described nor shown for avoiding redundancy.

The USB test circuit 10 may be applied to a USB device such as a system LSI (Large Scale Integration) with a USB function to generate and output in USB compliance test packets to be measured, such as an ACK (ACKnowledgement) packet and a test packet for observing the signal quality. Those packets will be received by an external USB host device, not shown, to observe the signal quality.

Figure 2:
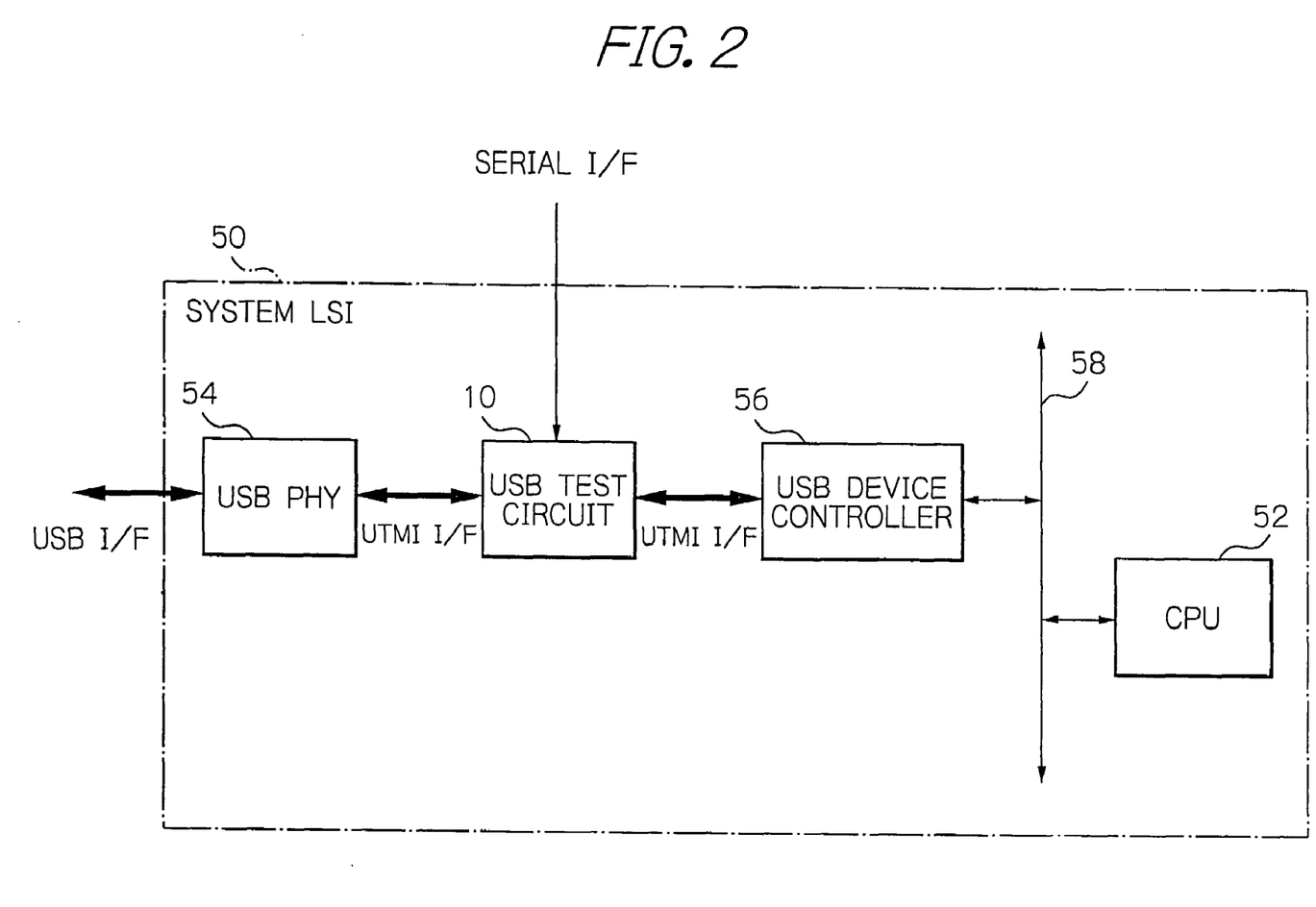
FIG. 2 is a block diagram schematically illustrating a system LSI to which the USB test circuit shown in FIG. 1 is applied.

Referring to FIG. 2, the test circuit 10 may be applied to an LSI 50 that may operate using a central processing unit (CPU) 52 built therein. The CPU 52 may connect via a system bus 58 to other circuits to perform the functions of the latter circuits. In this embodiment, the system bus 58 has a USB device controller 56 connected thereto that provides the USB function. The LSI 50 may select one of a variety of transfer rate modes such as a USB full speed mode, a low speed mode, and a high speed mode, and transmit and receive a packet in one of the modes selected.

The circuit 10 is an USB physical layer (PHY) test time reduction circuit. As shown in FIG. 2, for example, the circuit 10 resides in the LSI 50 between a USB physical layer 54 and the USB device controller 56 and is provided on the side of controller 56 and not on the side of USB PHY layer 54.

The CPU 52 is adapted to control the entire or general operation of the LSI 50. In this embodiment, the CPU 52 may write and read data to and from the register of the USB device controller 56.

The USB PHY layer 54 is adapted to connect, via UTMI (USB2.0 Transceiver Macrocell Interface) interface, to the USB device controller 56, and to connect, via USB interface, to an external device. In this embodiment, the USB PHY layer 54 connects, on one hand, via the UTMI interface to the circuit 10, and, on the other hand, via the circuit 10 to the controller 56.

The USB PHY layer 54 has a UTMI I/F controller block that may control the UTMI interface. The USB PHY layer 54 may transmit and receive, via the USB interface, a DP/DM (Differential data Plus/Differential data Minus) signal from the external device. The PHY layer 54 outputs a one-bit transmission enabling signal TXReady via the UTMI interface to the circuit 10, the enabling signal indicating whether or not the packet transmission is enabling.

In normal operation, the circuit 10 only functions as a communication path between the UTMI on the USB PHY layer 54 side and the UTMI on the USB device controller 56 side. In the USB test, however, without the necessity of the operations of the controller 56 and CPU 52, the circuit 10 is directly controlled from the serial interface to output the packet to be measured to the UTMI interface on the PHY layer 54 side. The PHY layer 54 then outputs the packet on the DP/DM signal.

The USB device controller 56 is adapted to control a protocol of the USB in the LSI 50. The USB device controller 56 connects to, via the system bus interface, to the system bus 58. The USB device controller 56 also connects, via the UTMI interface, to the circuit 10. The controller 56 may have, for example, a UTMI I/F controller that may control the UTMI interface.

The USB device controller 56 may also be adapted to include a protocol identifier (PID) decode block, a high speed test packet generation block, and an ACK packet generation block, which are not shown, to generate a test packet or an ACK packet in the normal USB compliance test.

The LSI 50 also has an external terminal or a test pin, not shown, which receives input from outside, and the circuit 10 is controlled by the terminal. The circuit 10 is controlled by, for example, a test signal that is inputted via the serial interface such as a test_sin signal or a test_stb signal to forcefully output a packet to be measured. The LSI 50 receives, for example, the test_sin signal from an external device such as a pattern generator on the terminal and supplies the signal to the circuit 10.

In the circuit 10, the serial I/F block 12 receives a test_sin signal 102 carrying information on the operation mode and a test_stb signal 104 synchronized with each bit data of the test_sin signal 102, bit by bit, via the serial interface. The block 12 also receives via the serial interface a one-bit reset signal 106 that initializes the circuit 10 and a clock signal 108 generated by the USB PHY layer 54.

The serial I/F block 12 may obtain from the test_sin signal 102 information such as the type of a packet to be measured, the frequency of a test output, and the number of bytes of a packet to be measured. The block 12 obtains, for example, the type of a packet to be measured indicating whether it is an ACK packet or test packet, and an endless flag as the frequency of a test output, indicating whether the output is repeated or generated only once, and the transmission byte number indicating the number of bytes per packet.

The serial I/F block 12 is adapted to generate a strobe signal 112 indicating the timing when the test_sin signal 102 is extracted. The serial I/F block 12 has a strobe_interval 110 as the internal signal that indicates the interval of the strobe signal 112. The serial I/F block 12 uses the strobe_interval 110, the test_stb signal 104, and the clock signal 108 to generate the one-bit strobe signal 112. The block 12 latches, in response to the high-level strobe signal 112, information indicated by the test_sin signal 102 in the internal register of the circuit 10. The block 12 has, for example, the strobe_interval [2:0] 110 that has a width of 3 bits from bit positions #0 to #2 and changes in synchronism with the clock signal 108 in the order of values 0, 1, 2, and 3.

In this embodiment, when a few clock intervals have passed since the serial I/F block 12 receives the high-level reset signal 108 and detects the high-level test_stb signal 104, in other words, at the timing when the test_sin signal 102 can surely be extracted, the serial I/F block 12 changes the strobe signal 112 to its high level and generates it only in the duration of one clock. In the circuit 10, if the cycle of the test_stb signal 104 is fixed in advance, the serial I/F block 12 may determine in advance the timing when the test_sin signal 102 can surely be extracted.

The serial I/F block 12 changes the strobe signal 112 thus changed to its high level to its low level, and then, sets the strobe_interval 110 to zero to start to count again the strobe_interval 110 in response to the clock signal 108. When the strobe_interval 110 changes from two to three, the block 12 changes the strobe signal 112 to its high level again only for one clock. The block 12 thus repeatedly counts the strobe_interval 110 to repeatedly generate the strobe signal 112.

In the test circuit 10, if the bit length of the operation mode information of the test_sin signal 102 is determined in advance, the number at which the serial I/F block 12 extracts the test_sin signal 102, i.e., the predetermined strobe number at which the strobe signal 112 changes to its high level may be determined in advance. In this embodiment, the block 12 counts the strobe signal 112, and when the strobe number 114 representative of a count value reaches the predetermined strobe number, the block 12 stops counting the strobe_interval 110 and generating the strobe signal 112. The block 12 may have as an internal signal a strobe number [4:0] 114 that has a width of 5 bits from bit positions #0 to #4.

The serial I/F block 12 is adapted to send, each time the strobe signal 112 changes to its high level, one-bit data included in the test_sin signal 102 to the internal register of the circuit 10, thereby writing the data to a register location corresponding to the strobe number 114. In this embodiment, a packet type 116, an endless flag 118 and a transmission byte number 120 are indicated by the test_sin signal 102 to be sent to the packet type register 14, the endless flag register 16, and to the transmission byte number register 18, respectively.

In this illustrative embodiment, the packet type register 14, the endless flag register 16, and the transmission byte number register 18 may be registers that hold the packet type [2:0] 116 having a width of 3 bits from bit positions #0 to #2, the one-bit endless flag 118, and the transmission byte number [10:0] 120 having a width of 11 bits from bit positions #0 to #10, respectively.

The packet type register 14 of this embodiment determines the strobe number 114 obtained from the serial I/F block 12, and when the strobe number 114 reaches a predetermined strobe number, the packet type register 14 supplies the packet type 116 to the data pattern generation block 20. The register 14 also instructs, when the strobe number 114 reaches a predetermined strobe number, the endless flag register 16 and the transmission byte number register 18 to supply the endless flag 118 and the transmission byte number 120 to the enabling-timing generation block 24, respectively.

The data pattern generation block 20 is adapted to obtain the packet type 122 from the packet type register 14, and determine, depending on whether the type 122 indicates the ACK packet or the test packet, the data pattern 124 in which fixed data is outputted in a fixed order. For example, the data pattern generation block 20 determines which data is outputted at what number of bytes, generates the data pattern 124, and supplies the data pattern 124 to the transmission data delivery block 22.

The data pattern generation block 20 of this embodiment may be adapted to provide a variety of data patterns in advance, and to allow the pattern selector 30 to select and determine one 124 of the data patterns. For example, the selector 30 may obtain a pattern count signal 126 from the counter 32, and determine the data pattern 124 from the packet type 122 and the pattern count signal 126.

The counter 32 counts in synchronism with the clock signal 108, generates the pattern count signal 126 representative of its count value, and supplies the signal 126 to the selector 30. The counter 32 is operative only in response to both the high-levels of the transmission enabling signal TXReady 128 from the USB PHY layer 54 and of the effective timing signal TXValidH/TXValid 130 from the enabling-timing generation block 24 to count the clock signal 108. The counter 32 may determine the pattern count signal 126 for each one-bit transmission data that is outputted from the circuit 10. In this embodiment, the counter 32 may be adapted to have as an internal signal a pattern count signal [5:0] 126 having a width of 6 bits from bit positions #0 to #5.

The data pattern generation block 20 may be adapted to generate the data pattern 124 representing a less-significant bit data pattern having a width of 8 bits from bit positions #0 to #7 and a more-significant bit data pattern having a width of 8 bits from bit positions #8 to #15 corresponding to the less- and more-significant parts of the transmission data that is outputted from the circuit 10, respectively. The block 20 may be responsive to the effective timing signals TXValidH/TX- Valid 130 related to the less- and more-significant bit data to generate the less- and more-significant bit data patterns, respectively.

The data pattern generation block 20 may determine the data pattern 124 depending on the output packet size. The data pattern generation block 20 may thus generate only the less-significant bit data pattern when outputting the one-byte ACK packet, and the less- and more-significant bit data patterns when outputting a two-byte or more packet.

When the data pattern generation block 20 receives the high-level repeat signal 132 from the packet-to-packet timing generation block 26, the counter 32 initializes the pattern count signal 126 to zero for the next transmission data. This allows the counter 32 to repeatedly count, in response to the repeat signal 132, the clock signal 108 to newly generate the pattern count signal 126, and the block 20 to generate the data pattern 124 for the next transmission data.

The transmission data delivery block 22 uses the data pattern 124 supplied from the data pattern generation block 20 to generate the transmission data DataIn 134. In this embodiment, the selector 34 uses the packet type 122 and data pattern 124 to determine the transmission data DataIn 134. The delivery block 22 may be adapted to generate the transmission data [15:0] 134 that has a width of 16 bits from bit positions #0 to #15.

The transmission data delivery block 22 is adapted to send, at a timing in response to the effective timing signal TXValidH/TXValid 130, the transmission data DataIn 134 to the UMTI interface. In this embodiment, the transmission data delivery block 22 outputs, in response to the high level of the effective timing signal TXValidH/TXValid 130, the transmission data DataIn 134 that is the packet to be measured, via the UTMI interface on the PHY layer 54 side, to the PHY layer 54.

The transmission data delivery block 22 may obtain, for example, the less- and more-significant bit data patterns as the data pattern 124, generate one transmission data DataIn 134 in response to the effective timing signals TXValidH/TX-Valid 130 respectively related to the patterns, and output the transmission data DataIn 134 when either of the effective timing signals TXValidH/TXValid 130 is in its high level.

The enabling-timing generation block 24 is adapted to generate and output, depending on the transmission byte number 136 from the transmission byte number register 18, the effective timing signal TXValidH/TXValid 130 that indicates the timing when the transmission data DataIn 134 is enabled.

When the enabling-timing generation block 24 of this embodiment determines that the test_sin signal 102 and test_stb signal 104 as the test signals are completely inputted, the block 24 changes the effective timing signal TXValidH/TXValid 130 to its high level and generates the signal TXValidH/TXValid 130, and loads the temp_data byte_count 138 with the transmission byte number 136 thus inputted. On the determination, the generation block 24 may set the transmission byte number that is determined in advance for each packet type 122 to the temp_data_byte_count 138 and the transmission byte number 136. The generation block 24 preferably has as an internal signal the temp_data_byte_count [10:0] 138 that has a width of 11 bits from bit positions #0 to #10.

When, for example, the strobe number 114 in the serial I/F block 12 reaches a predetermined strobe number and the enabling-timing generation block 24 obtains the transmission byte number 136 from the transmission byte number register 18, the block 24 may determine that the test signal is completely inputted.

When the generation block 24 changes the effective timing signal TXValidH/TXValid 130 to its high level, the counter 36 starts to count down the transmission byte number 136. When, for example, the generation block 24 receives the high-level transmission enabling signal TXReady 128, the counter 36 starts to count down in synchronism with the clock signal 108, and when the count reaches zero, the block 24 changes the effective timing signal TXValidH/TXValid 130 to its low level.

The generation block 24 also generates, in response to an endless flag 140 inputted from the endless flag register 16, an interval_enable signal 142 and supplies the signal 142 to the packet-to-packet timing generation block 26 to inform the block 26 of whether or not the timing for the next transmission data output is generated. When, for example, the generation block 24 receives the high-level endless flag 140 and changes the effective timing signal TXValidH/TXValid 130 to its low level, the block 24 changes the interval_enable signal 142 to its high level to instruct the block 26 to generate the timing.

The generation block 24 may generate, in response to the repeat signal 132 inputted from the packet-to-packet timing generation block 26, the effective timing signal TXValidH/TXValid 130 for the next transmission data output. When, for example, the repeat signal 132 is changed from its high level to its low level, the generation block 24 loads the value of the temp_data_byte_count 138 to the transmission byte number 136 of the transmission byte number register 18 to enable the counter 36 to count down and changes the effective timing signal TXValidH/TXValid 130 to its high level.

The packet-to-packet timing generation block 26 is adapted to control, when the circuit 10 repeatedly outputs the packet to be measured to the UTMI interface, the interval between a predetermined packet output and the following packet output. The generation block of the embodiment generates the repeat signal 132 that indicates the timing when the next packet to be measured is generated, and supplies the signal 132 to the data pattern generation block 20 and the enabling-timing generation block 24.

The packet-to-packet timing generation block 26 allows, for example, the counter 38 to count up in response to the clock signal 108, and stores the count value as an interval_count 144. The generation block 26 also determines a predetermined packet interval in advance, and when the interval_count 144 reaches the predetermined packet interval, the block 26 changes the repeat signal 132 to its high level only for one clock and outputs the signal 132.

The counter 38 may be adapted to start, for example, responsively to the high-level interval_enable signal 142 inputted from the enabling-timing generation block 24, to count up the interval_count 144, and initialize the interval_count 144 when it receives the low-level interval_enable signal 142. The counter 38 may have as an internal signal the interval_count [15:0] 144 that has a width of 16 bits from bit positions #0 to #15.

Next, the operation of the USB test circuit 10 of the illustrative embodiment will be described with reference to the timing charts shown in FIGS. 3 to 6 as an example of generating and outputting ACK packets for the purpose of observing the signal quality when the transfer rate mode is the full speed. FIGS. 3 through 6 are continuous in sequence.

Figure 3:
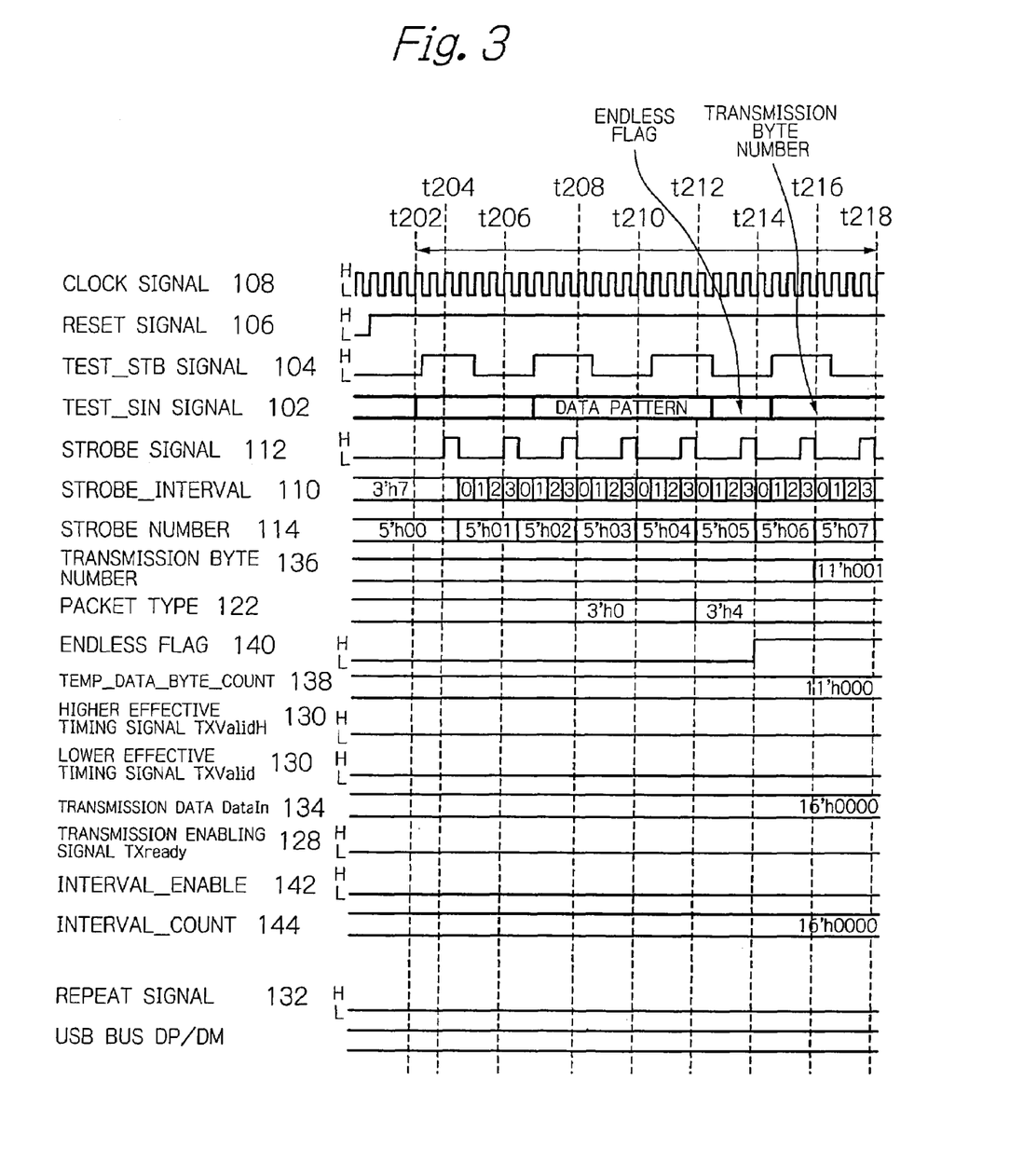
FIGS. 3 through 6 are a timing chart useful for understanding how the USB test circuit shown in FIG. 1 operates in a full speed mode.

In the circuit 10 of this embodiment, as shown in FIG. 3, the 30 MHz clock signal 108 is first inputted to operate each portion. The high-level reset signal 106 is then inputted to initialize all of the internal signals of each portion or the like.

In the circuit 10, the test_sin signal 102 and test_stb signal 104 as the test signals are inputted from outside via the serial interface to the serial I/F block 12. The test_sin signal 102 of a 68 clock length is inputted from the time t202 to t222. In the test_sin signal 102, the packet type indicates the ACK packet, the endless flag indicates repeating, and the transmission byte number indicates one byte.

The block 12 constantly monitors the test_stb signal 104, for example. After time t202, the high-level test_stb signal 104 is detected for the first time, and then some clocks later (two clocks later at time t204 in this embodiment), the block 12 changes the strobe signal 112 to its high level only for the period corresponding to one clock.

When the strobe signal 112 changes to its low level, the strobe_interval 110 is counted up in synchronism with the clock signal 108 from zero to three. When the strobe_interval 110 changes from two to three at time t206, the strobe signal 112 changes again to its high level only for one clock.

Thus, in response to the change of the strobe signal 112, the strobe_interval 110 is repeatedly counted up. Each time the interval 110 is counted up, the strobe signal 112 changes to its high level. Each time the strobe signal 112 changes to its low level, the number of the strobe signal 112 is counted as the strobe number 114.

When the strobe signal 112 changes to its low level, the one-bit test_sin signal 102 inputted to the serial I/F block 12 is sent to the internal register, and is written to a register location depending on the strobe number 114 at that time.

In this embodiment, at time t208, the third bit data in the test_sin signal 102 is inputted. This one-bit data 116 indicates a portion of the packet type, and is sent to the packet type register 14 along with the strobe number 114 at that time. The register 14 writes the bit data 116 to a register location depending on the strobe number 114.

Likewise, at times t210 and t212, the fourth and fifth bit data in the test_sin signal 102 are sent to the packet type register 14 as the data 116 indicating a portion of the packet type. The register 14 writes the data to register locations depending on the strobe numbers 114, respectively. Thus, the packet type 116 having a width of 3 bits from bit positions #0 to #2 is latched in the register 14.

At time t214, the sixth bit data in the test_sin signal 102 is inputted. The sixth bit data is the one-bit endless flag 118, and is sent to the endless flag register 16 along with the strobe number 114 at that time. The register 16 writes the endless flag 118 to a register location depending on the strobe number 114.

At time t216, the seventh bit data in the test_sin signal 102 is inputted. The one-bit data 120 is adapted to indicate a portion of the transmission byte number. The data 120 is sent along with the strobe number 114 at that time to the transmission byte number register 18. The register 18 writes the bit data 120 to a register location depending on the strobe number 114.

Figure 4:
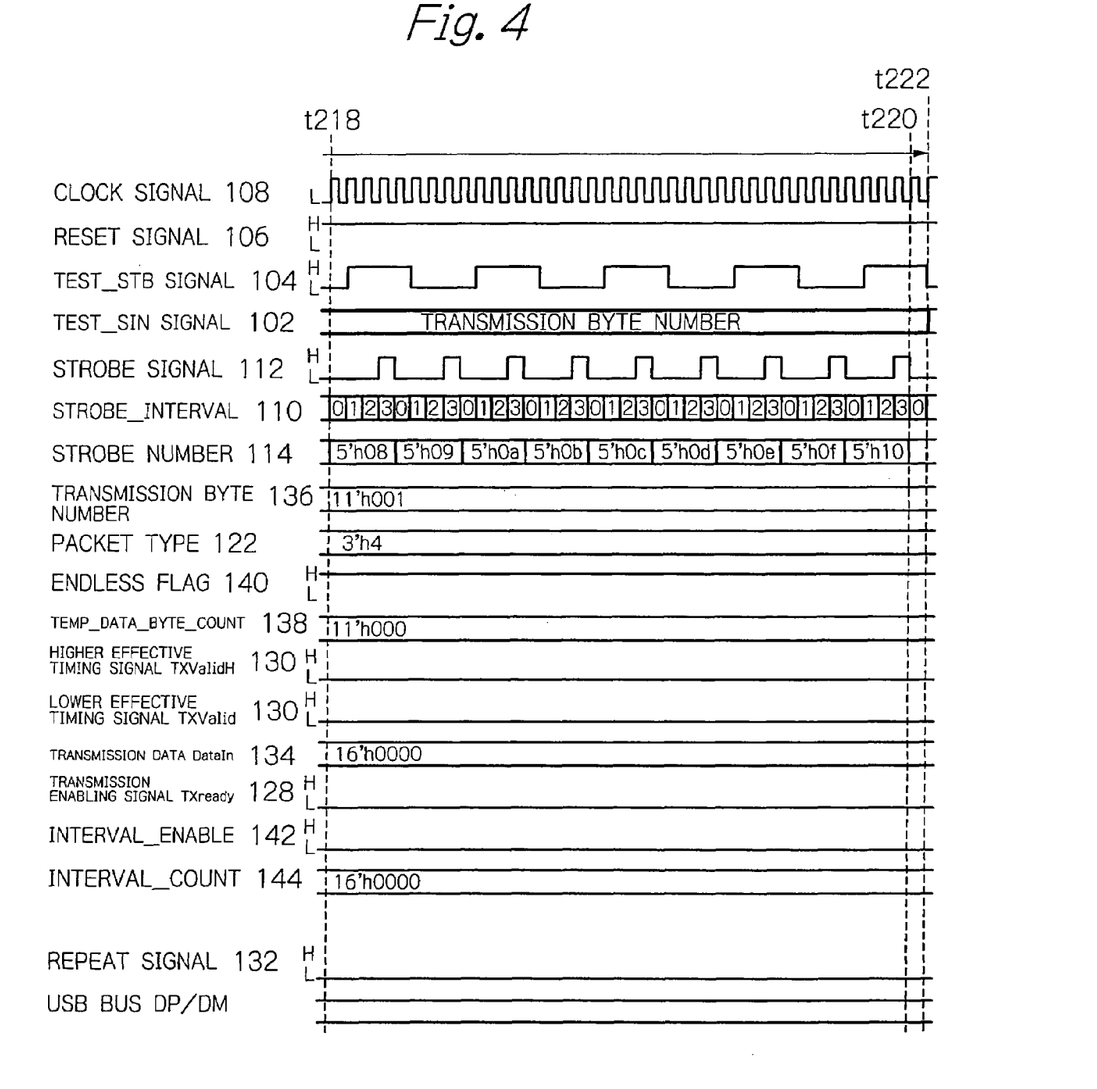

Likewise, from the time t218 to t220, each time the strobe signal 112 changes to its low level, the test_sin signal 102 provides one-bit data. Each of the data is sent to the transmission byte number register 18 as data 120 indicating a portion of the transmission byte number. The register 18 writes the data to a register location depending on the strobe number 114. Here, from the time t218 to t220, the strobe signal 112 changes to its low level ten times, i.e., the 8th to 17th bit data are provided. Thus, the transmission byte number 120 that has a width of 11 bits from bit positions #0 to #10 is latched in the register 18.

In the serial I/F block 12 of this embodiment, the strobe signal 112 changes to its high level for a predetermined strobe number (18 times in this embodiment). At time t224, the 18th strobe signal 112 changes to its low level, and the strobe number 114 reaches a value "18".

Figure 5:
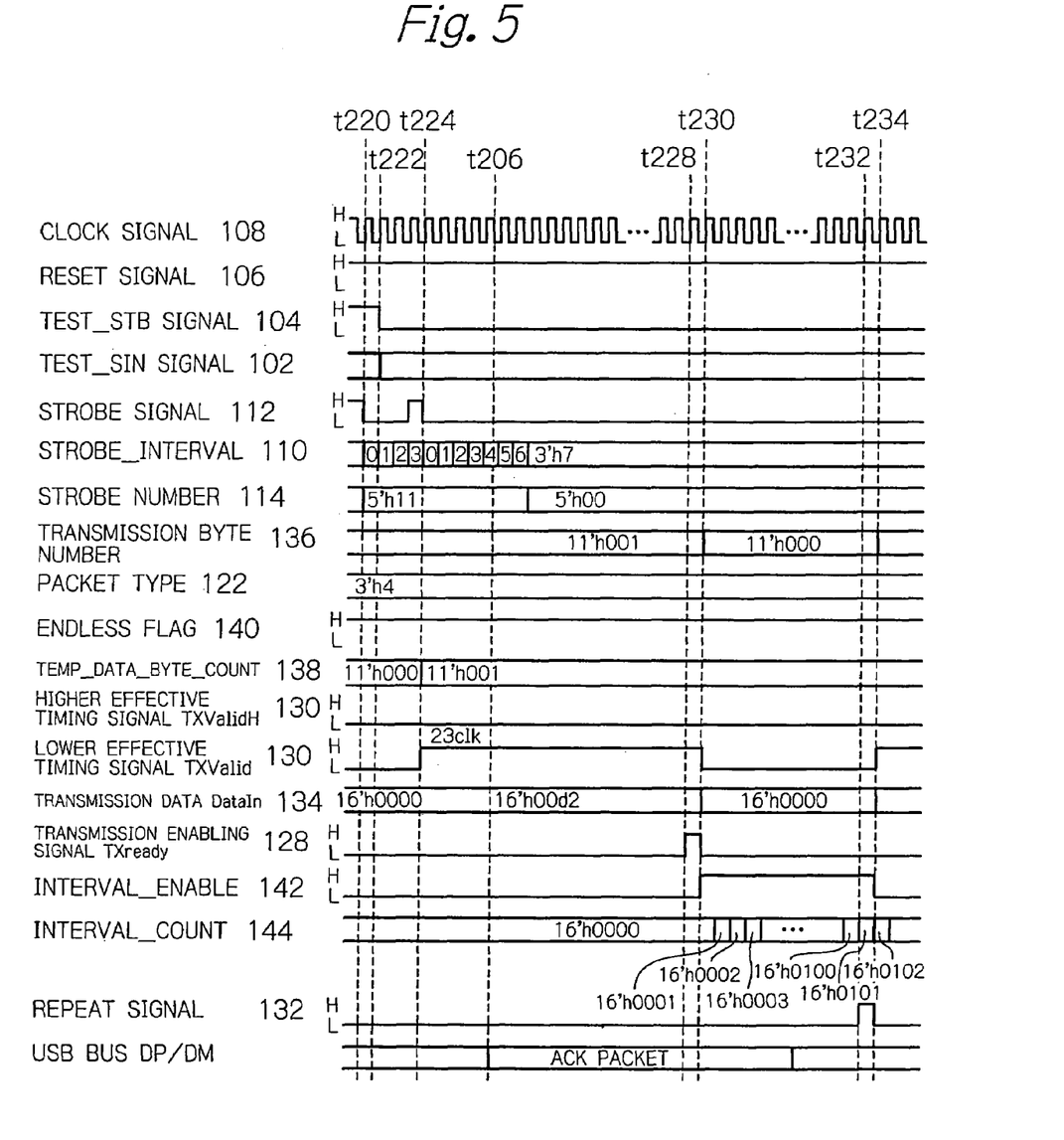

As shown in FIG. 5, when the strobe number 114 in the serial I/F block 12 reaches a predetermined strobe number at time t224, the packet type 122 of the packet type register 14 is supplied to the data pattern generation block 20, and the register 14 instructs the endless flag register 16 and the transmission byte number register 18 to supply the endless flag 140 and the transmission byte number 136 to the enabling-timing generation block 24, respectively. The enabling-timing generation block 24 of this embodiment determines, when at time t224 the transmission byte number 136 is obtained, that the test signal is completely inputted, and the block 24 loads the transmission byte number 136 to the temp_data_byte_count 138, and changes the effective timing signal TXValidH/TXValid 130 to its high level. Because the one byte ACK packet is outputted here, only the lower-order effective timing signal, which affects the less-significant bit position or positions of the transmission data, is changed to its high level.

The high-level effective timing signal TXValidH/TXValid 130 is supplied to the data pattern generation block 20 and transmission data delivery block 22.

Subsequently, at time t226, the transmission enabling signal TXReady 128 of the generation block 20 is its low level, so the counter 32 does not count the pattern count signal 126, and the generation block 20 supplies the data pattern 124 of a zero value to the delivery block 22. In the delivery block 22, therefore, depending on the data pattern 124 and the packet type 122 that indicates the ACK packet, the selector 34 generates and outputs the ACK packet DataIn 134 of a value of zero.

When, at time t228, the transmission enabling signal TXReady 128 changes to its high level, the enabling-timing generation block 24 allows the counter 36 to count down until the transmission byte number 136 reaches zero in response to the clock signal 108. In this embodiment, the transmission byte number 136 is one byte, so the number 136 reaches zero at time t230, which is one clock cycle after time t228.

At time t228, the data pattern generation block 20 allows the counter 32 to start to count in response to the high-level effective timing signal TXValidH/TXValid 130 and transmission enabling signal TXReady 128. The selector 30 then provides the data pattern 124 depending on the pattern count signal 126 indicating the count value and the packet type 122 indicating the ACK packet.

Because only the lower-order effective timing signal is in its high level here, only the less-significant bit data pattern is provided and is supplied along with the more-significant bit data pattern indicating zero to the transmission data delivery block 22 as the data pattern 124.

The delivery block 22 allows, at time t228, the selector 34 to generate, depending on the packet type 122 indicating the ACK packet and the data pattern 124 having only the less-significant bit data pattern, the ACK packet DataIn 134 having only the less-significant bit data, which is outputted via the UTMI interface in response to the effective timing signal TXValidH/TXValid 130 in its high level.

The ACK packet DataIn 134 thus outputted is supplied to the USB PHY layer 54 and is transmitted out of the LSI 50.

In the enabling-timing generation block 24, when the transmission byte number 136 in the counter 36 reaches zero at time t230, the effective timing signal TXValidH/TXValid 130 changes to its low level. The data pattern generation block 20 thus stops generating the data pattern 124, and the transmission data delivery block 22 stops outputting the transmission data DataIn 134. In this embodiment, at time t230, the transmission enabling signal TXReady 128 is also in its low level, which is not, however, intended by the circuit 10.

In this embodiment, the endless flag 140 indicating repetitions is supplied to the enabling-timing generation block 24. In the generation block 24, therefore, at time t230 when the effective timing signal TXValidH/TXValid 130 changes to its low level, the high-level interval_enable signal 142 is supplied to the packet-to-packet timing generation block 26.

In the packet-to-packet timing generation block 26, in response to the high-level interval_enable signal 142, the interval_count 144 is counted sequentially from one. When the interval_count 144 reaches a predetermined packet interval at time t232, the repeat signal 132 changes to its high level only for one clock and is supplied to the data pattern generation block 20 and enabling-timing generation block 24.

Figure 6:
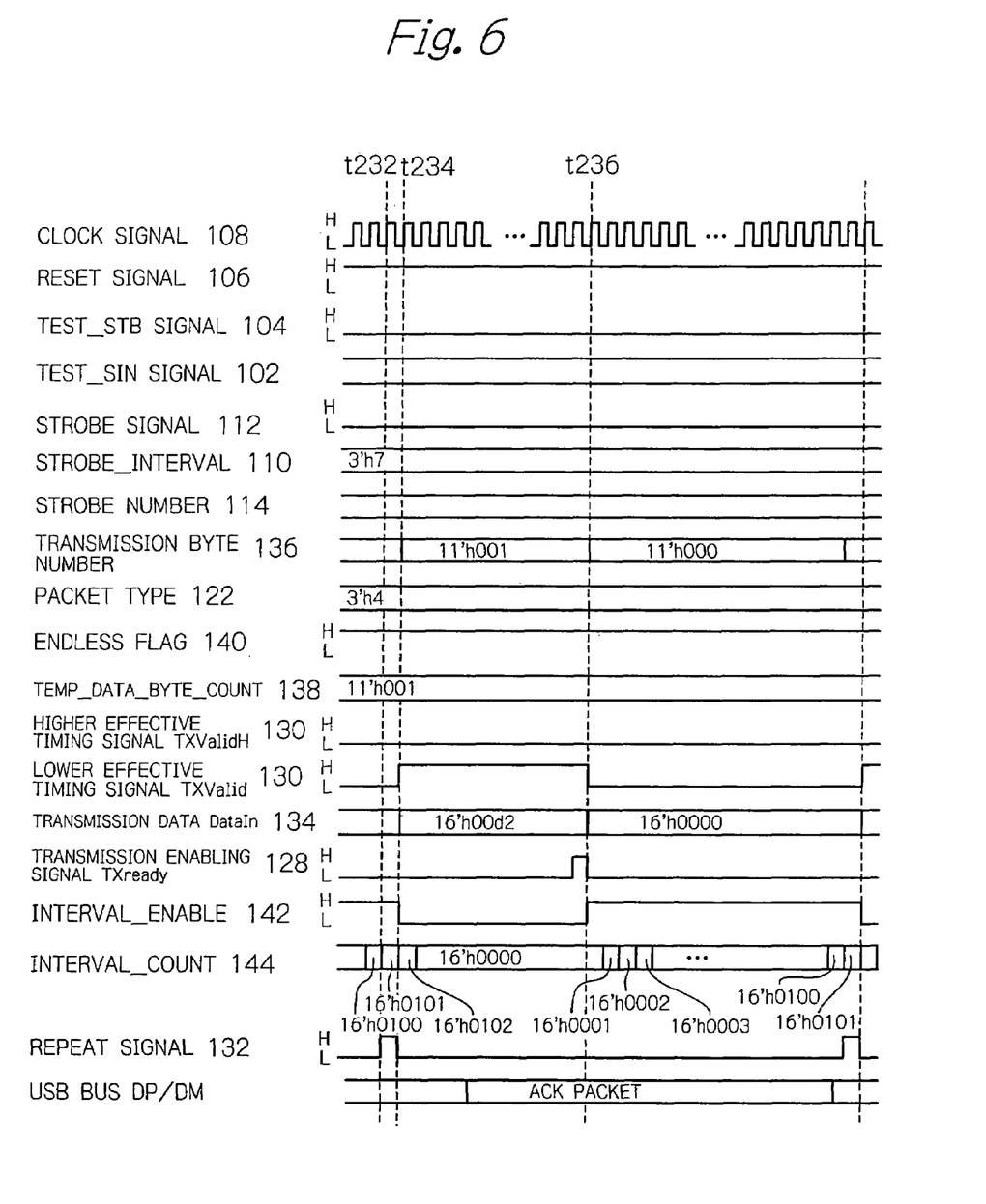

In response to the high-level repeat signal 132, the data pattern generation block 20 initializes the pattern count signal 126 of the counter 32, and the enabling-timing generation block 24 changes the effective timing signal TXValidH/TXValid 130 to its high level at time t234, and loads the value of the temp_data_byte_count 138 to the transmission byte number 136 of the transmission byte number register 18. In the block 24, the interval_enable signal 142 changes to its low level at time t234 when the effective timing signal TXValidH/TXValid 130 changes to its high level.

Thus, like the operation from the time t224 to t230, the following operation is performed from the time t234 to t236. The enabling-timing generation block 24 allows the counter 36 to count down the transmission byte number 136. The data pattern generation block 20 allows the counter 32 to generate the pattern count signal 126 and also allows the selector 30 to generate the data pattern 124. The transmission data delivery block 22 allows the selector 34 to generate the transmission data DataIn 134.

Subsequently, in response to the endless flag 140 indicating repetition, the operation from the time t230 to t236 is repeated.

In addition, the operation of the USB test circuit 10 of the illustrative embodiment will be briefly described with reference to a sequence chart shown in FIG. 7 as an example of how an ACK packet generated by the circuit 10 is transmitted to a USB host device, not shown.

Figure 7:
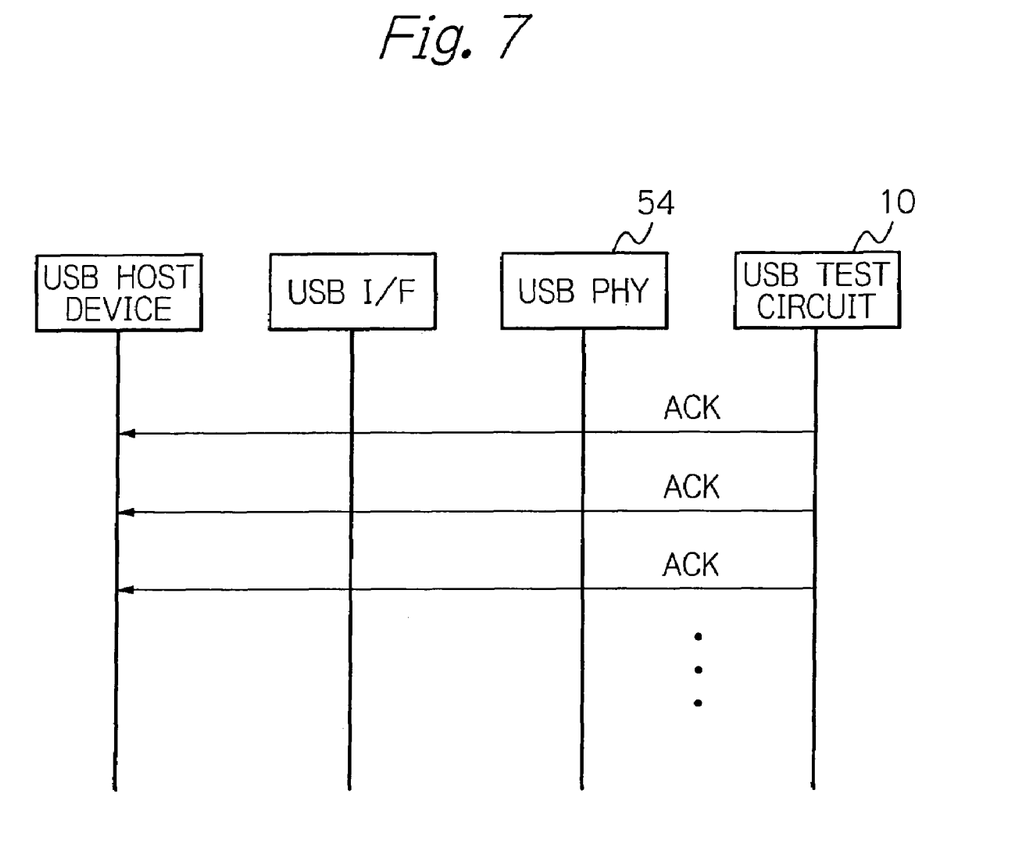
FIG. 7 is a sequence chart useful for understanding how the USB test circuit shown in FIG. 1 outputs an ACK packet.

As shown in FIG. 7, when the USB test circuit 10 generates an ACK packet in response to the test signal such as the test_sin signal or the test_stb signal, the ACK packet is outputted to the USB PHY layer 54 in the USB device into which the circuit 10 is incorporated, and is also transmitted via the USB interface to the USB host device.

The circuit 10 may thus output the ACK packet without receiving the packet not to be measured for the signal quality test, thereby eliminating the time needed for receiving the unwanted packet.

Furthermore, as shown in FIG. 7, the USB test circuit 10 of the present invention does not receive, even when the ACK packets are repeatedly generated and outputted, the packet not to be measured, thereby effectively reducing the test time.

The USB test circuit 10 of this embodiment needs 68 clocks to extract information on the operation mode from the test_sin signal 102 and set the information. The USB PHY layer 54 needs from over ten μsec to a few msec for the initialization process such as the resetting or calibration of the termination resistance. The circuit 10 however may set the operation mode information in parallel with the initialization process in the PHY layer 54, thus providing no extra test time.

Well, the operation of the USB test circuit 10 of the illustrative embodiment will be described with reference to the timing charts shown in FIGS. 8 to 11 as an example of generating and outputting test packets in order to observe the signal quality when the transfer rate modes is the high speed. FIGS. 8 through 11 are also continuous in sequence.

In the test_sin signal 102 that is inputted, the packet type indicates the test packet, the endless flag indicates repeating, and the transmission byte number indicates 56 bytes. These are held in the packet type register 14, the endless flag register 16, and the transmission byte number register 18 in a similar way to that in the embodiment described with reference to FIGS. 3 and 4. Its repetitive description is thus omitted here.

Figure 8:
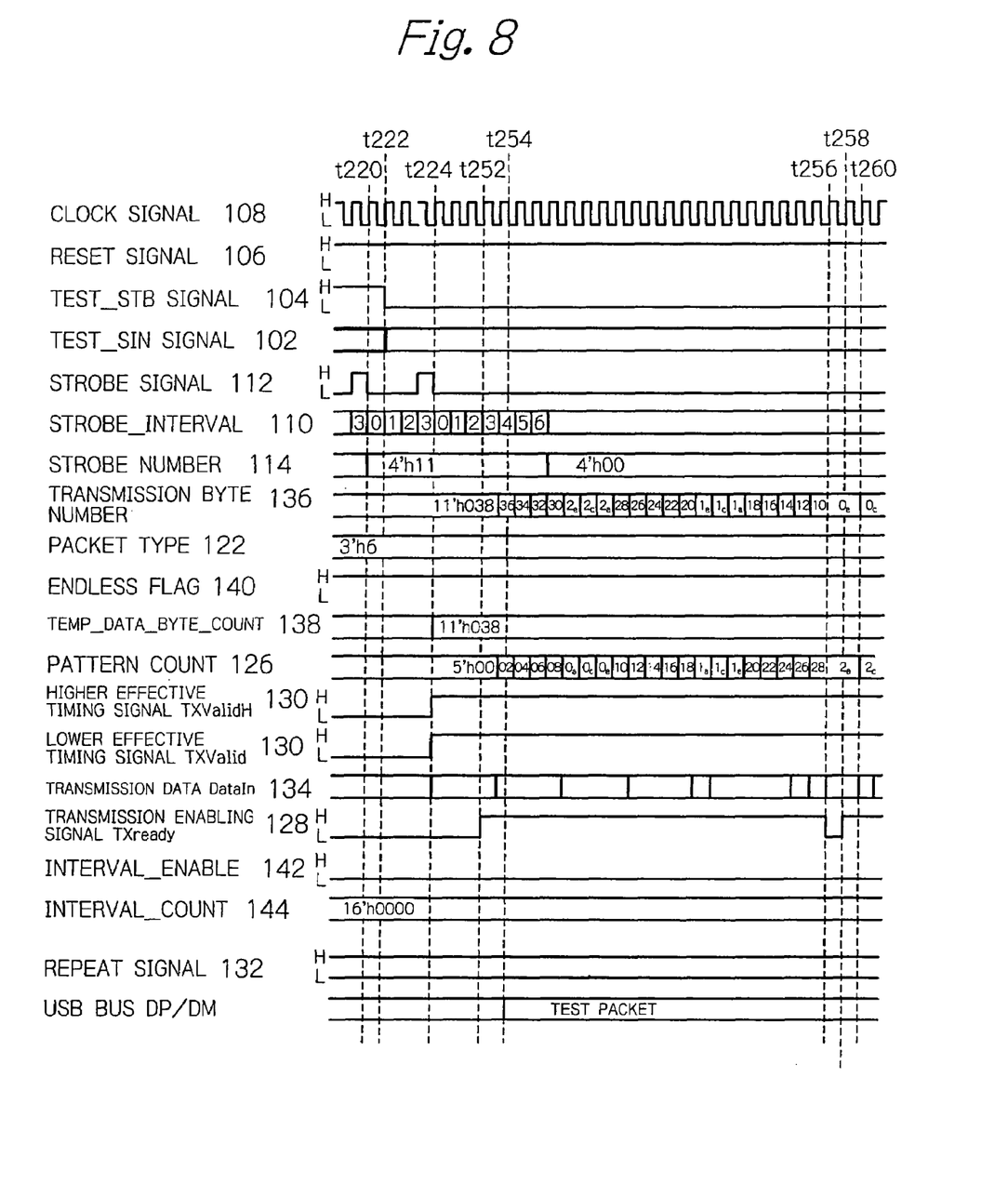
FIGS. 8 through 11 are a timing chart useful for understanding how the USB test circuit shown in FIG. 1 operates in a high speed mode.

As shown in FIG. 8, when in the serial I/F block 12 of this embodiment, the strobe number 114 reaches, at time t224, a predetermined strobe number, the packet type 122 of the packet type register 14 is supplied to the data pattern generation block 20, and the register 14 instructs the endless flag register 16 and transmission byte number register 18 to supply the endless flag 140 and transmission byte number 136 to the enabling-timing generation block 24, respectively.

The enabling-timing generation block 24 of this embodiment determines, when at time t224 the transmission byte number 136 is obtained, that the test signal is completely inputted, and the block 24 loads the transmission byte number 136 to the temp_data_byte_count 138, and changes the effective timing signal TXValidH/TXValid 130 to its high level. Because the transfer rate mode is the high speed mode here, the lower- and higher-order effective timing signals, which affect the less- and more-significant parts of the transmission data, respectively, are both changed to the high level thereof.

The high-level effective timing signal TXValidH/TXValid 130 is supplied to the data pattern generation block 20 and transmission data delivery block 22.

Subsequently, at time t252, the transmission enabling signal TXReady 128 inputted to the generation block 20 changes to its high level, so the counter 32 starts to count in response to the high-level effective timing signal TXValidH/TXValid 130 and transmission enabling signal TXReady 128, and depending on the pattern count signal 126 indicating the count value and the packet type 122 indicating the test packet, the data pattern 124 is provided by the selector 30 and supplied to the delivery block 22.

Because the lower- and higher-order effective timing signals are both at the high level thereof here, the less- and more-significant bit data patterns are both supplied to the delivery block 22 as the data pattern 124.

The delivery block 22 allows, at time t254 corresponding to the data pattern 124, the selector 34 to generate, depending on the packet type 122 indicating the test packet and the data pattern 124 having both of the less- and more-significant bit data patterns, the test packet DataIn 134 having both of the less- and more-significant bit data, and output the packet DataIn 134 via the UTMI interface in response to the effective timing signal TXValidH/TXValid 130 in its high level.

The test packet DataIn 134 thus outputted is supplied to the USB PHY layer 54, which transmits the test packet DataIn 134 out of the LSI 50.

The enabling-timing generation block 24 allows the counter 36 to count down until the transmission byte number 136 of 56 bytes reaches zero in response to the clock signal 108. In this embodiment, at time t256 halfway during the countdown, the transmission enabling signal TXReady 128 changes to its low level and the counter 36 stops counting down the transmission byte number 136.

Because, at the same time, the data pattern generation block 20 allows the counter 32 to stop counting the pattern count signal 126, when the counter 32 is synchronized with the next clock signal 108 at time t258, the preceding pattern count signal 126 is directly supplied to the selector 30, and the same data pattern 124 as the preceding is selected and supplied to the delivery block 22. In the transmission data delivery block 22, therefore, depending on the data pattern 124 and the packet type 122 that indicates the test packet, the selector 34 generates and outputs the same test packet DataIn 134 as the preceding.

Figure 9:
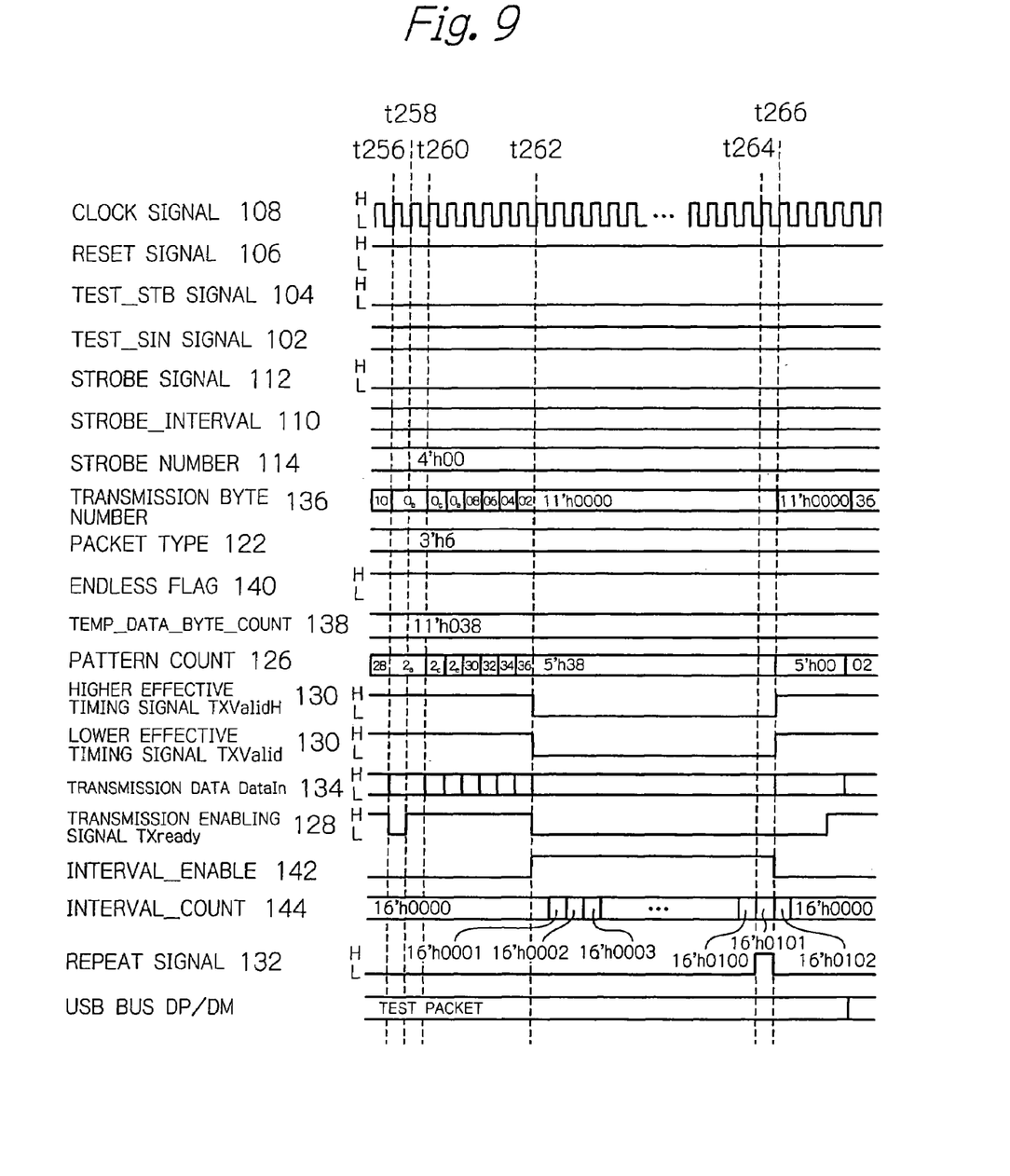

When, at time t258, the transmission enabling signal TXReady 128 changes again to its high level, the enabling-timing generation block 24 allows the counter 36 to count down again the transmission byte number 136, and the data pattern generation block 20 allows the counter 32 to count again the pattern count signal 126.

Further, the counter 32 counts, at time t260 when it is synchronized with the clock signal 108, the pattern count signal 126, and depending on the counted pattern count signal 126 and the packet type 122 indicating the test packet, the data pattern 124 is provided by the selector 30 and is supplied to the delivery block 22. The delivery block 22 generates, depending on the data pattern 124 provided at time t260, the test packet DataIn 134.

In the counter 36 in the enabling-timing generation block 24, at time t262, the transmission byte number 136 changes to zero and the effective timing signal TXValidH/TXValid 130 changes to its low level. The data pattern generation block 20 then stops generating the data pattern 124, and the transmission data delivery block 22 stops outputting the transmission data DataIn 134. In this embodiment, at time t262, the transmission enabling signal TXReady 128 is also in its low level, which is not, however, intended by the circuit 10.

Because the enabling-timing generation block 24 of this embodiment is supplied with the endless flag 140 indicating repetition, when, at time t262, the effective timing signal TXValidH/TXValid 130 changes to its low level, the high-level interval_enable signal 142 is supplied to the packet-to-packet timing generation block 26.

As in the above embodiment, the generation block 26 counts, in response to the high-level interval_enable signal 142, the interval_count 144. At time t264, the interval_count 144 reaches a predetermined packet interval, and then the repeat signal 132 changes to its high level only for one clock.

Figure 10:
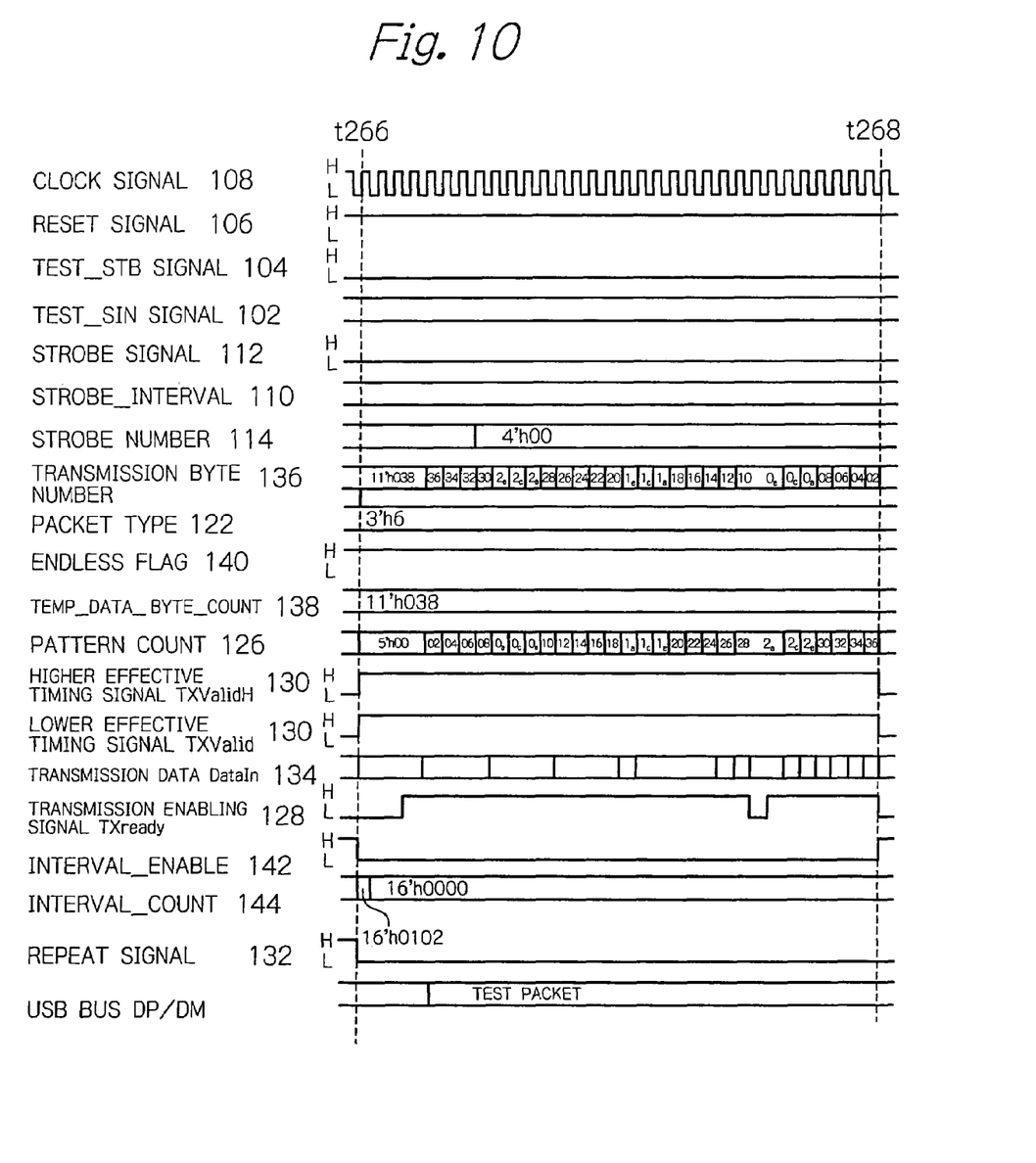

The high-level repeat signal 132 is supplied to the data pattern generation block 20 and enabling-timing generation block 24. The block 20 then initializes the pattern count signal 126 of the counter 32. The block 24 changes, at time t266, the effective timing signal TXValidH/TXValid 130 to its high level, changes the interval_enable signal 142 to its low level, and loads the value of the temp_data_byte_count 138 to the transmission byte number 136 of the transmission byte number register 18.

Thus, like the operation from the time t224 to t262, the following operation is performed from the time t266 to t268 as shown in FIG. 10. The enabling-timing generation block 24 allows the counter 36 to count down the transmission byte number 136. The data pattern generation block 20 allows the counter 32 to generate the pattern count signal 126 and also allows the selector 30 to generate the data pattern 124. The transmission data delivery block 22 allows the selector 34 to generate the transmission data DataIn 134.

Figure 11:
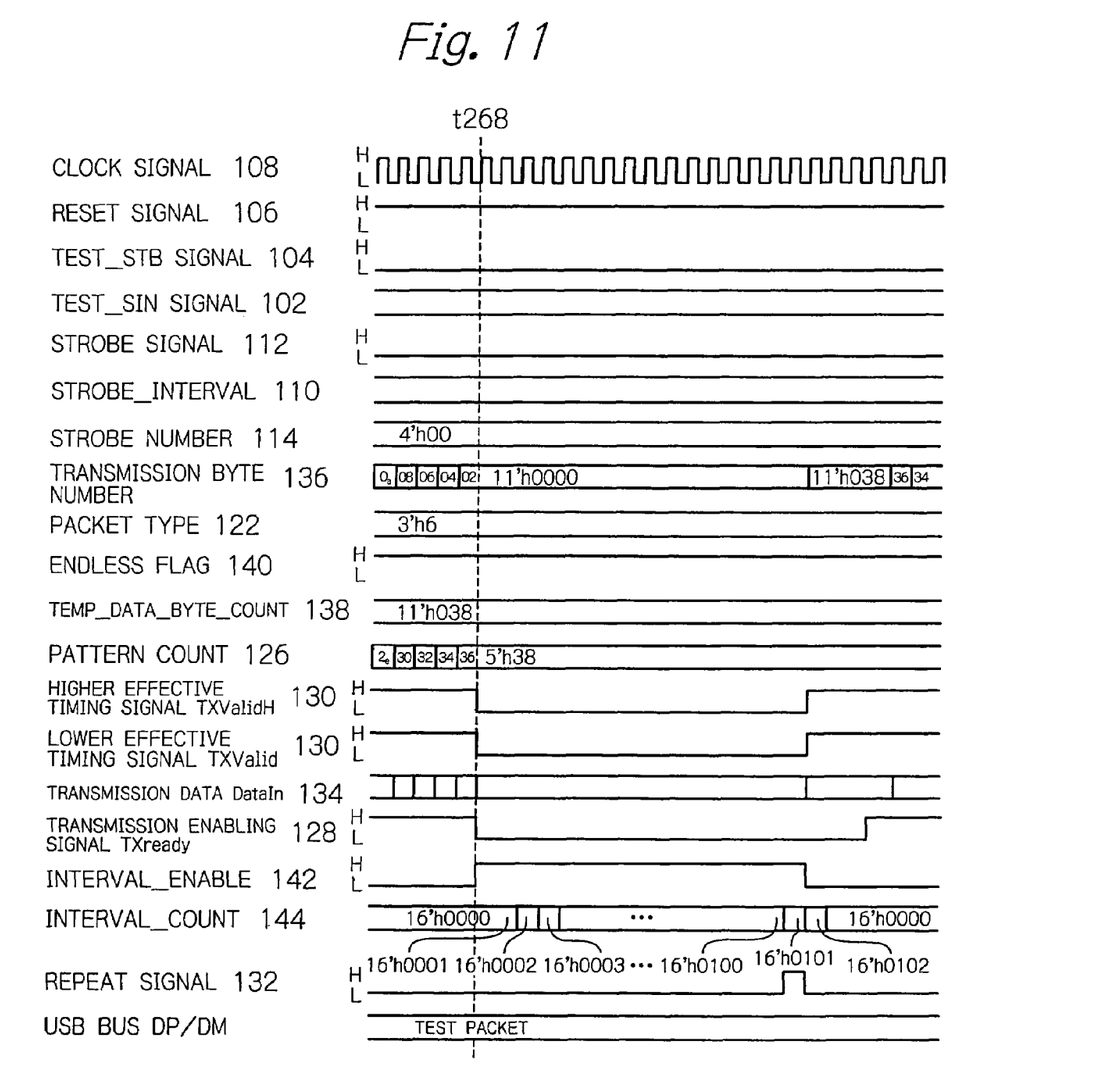

Subsequently, in response to the endless flag 140 indicating repetition, the operation at the time t262 to t268 is repeated.

In addition, the operation of the USB test circuit 10 of the illustrative embodiment will be briefly described with reference to a sequence chart shown in FIG. 12 as an example how the test packet generated by the circuit 10 is transmitted to the USB host device.

As shown in FIG. 8, when the USB test circuit 10 generates the test packet in response to the test signal such as the test_sin signal or the test_stb signal, the test packet is outputted to the USB PHY layer 54 in the USB device into which the circuit 10 is incorporated, and is also transmitted via the USB interface to the USB host device.

The circuit 10 may thus output the test packet without receiving the packet not to be measured for the signal quality, thereby eliminating the time needed for receiving the unwanted packets.

Figure 12:
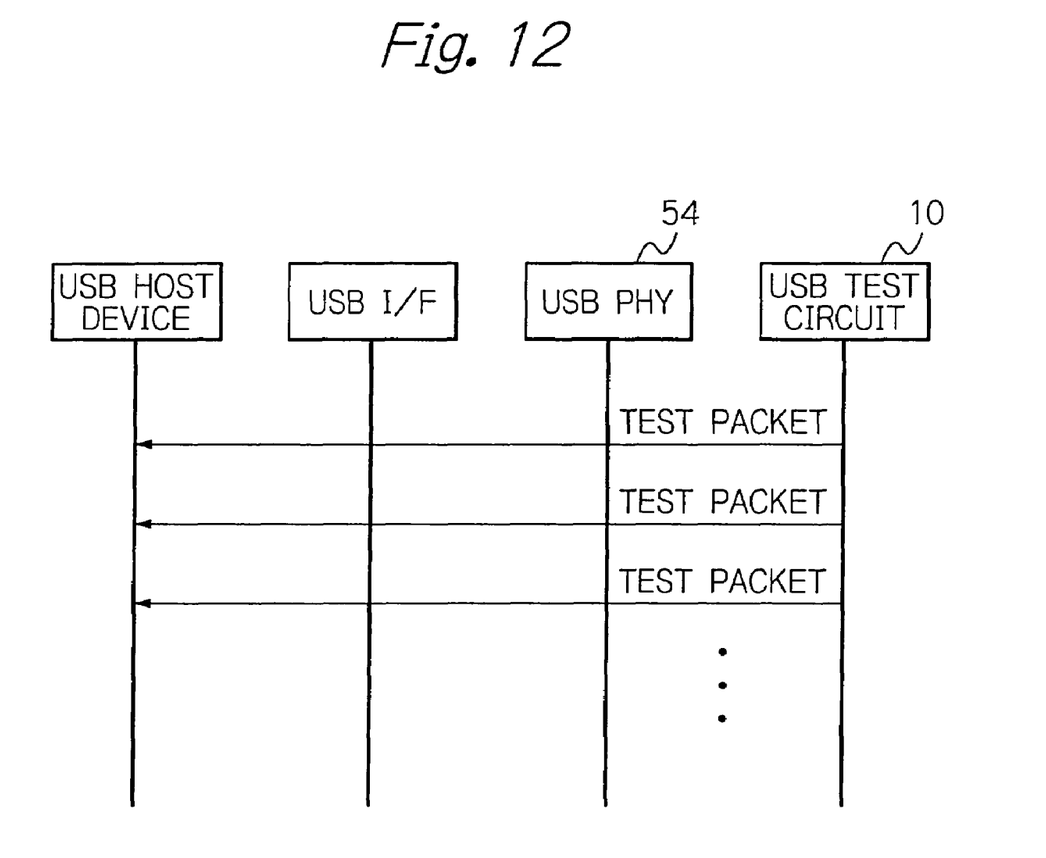
FIG. 12 is a sequence chart useful for understanding how the USB test circuit shown in FIG. 1 outputs a test packet.

Furthermore, as shown in FIG. 12, the USB test circuit 10 of the present invention does not receive a packet not to be measured even when the test packets are repeatedly generated and outputted, thereby effectively reducing the test time.

The entire disclosure of Japanese patent application No. 2006-266655 filed on Sep. 29, 2006, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A USB (Universal Serial Bus) test circuit incorporated in a USB device for actualizing a USB connection and used for a compliance test of the USB device, said circuit comprising:
   an input portion that receives from an external device a test signal including operation mode information of said circuit and a timing signal synchronized with each bit data of the operation mode information; and
   a generation portion that generates a packet to be measured for testing signal quality and outputs the packet,
   said input portion receiving the operation mode information including a packet type of the packet to be measured which is desired to be generated, an endless flag that indicates whether or not to repeatedly generate and output the packet to be measured and a number of transmission bytes per packet of the packet to be measured which is desired to be generated, and extracting each bit data of the operation mode information at a timing corresponding to the timing signal and synchronized with a clock signal in the USB device,
   said generation portion generating the packet to be measured depending on the operation mode information inputted to said input portion.

2. The USB test circuit in accordance with claim 1, wherein said generation portion outputs the packet to be measured via a UTMI interface (USB2.0 Transceiver Macrocell Interface) to a physical layer of the USB device.

3. The USB test circuit in accordance with claim 1, wherein the USB device operates in a mode selected from a plurality of transfer rate modes, and
   said generation portion generates the packet to be measured depending on one of the transfer rate modes which is selected in the USB device.

4. The USB test circuit in accordance with claim 3, wherein the transfer rate modes include full speed, low speed, and high speed modes.

5. The USB test circuit in accordance with claim 3, wherein said generation portion determines a plurality of data patterns in advance, selects one of the data patterns depending on the operation mode information, and generates the packet to be measured depending on the selected data pattern.

6. The USB test circuit in accordance with claim 5, wherein said generation portion selects one of the data patterns for each one-bit data of the packet to be measured.

7. The USB test circuit in accordance with claim 1, wherein said input portion serially receives the test signal from the external device.

8. The USB test circuit in accordance with claim 1, wherein the USB device is fabricated in a form of system LSI (Large Scale Integration).

* * * * *